United States Patent
Royzen

(10) Patent No.: US 8,985,971 B2
(45) Date of Patent: Mar. 24, 2015

(54) PFA MOTOR PROTECTION BAG

(75) Inventor: Arcady Royzen, Norman, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 422 days.

(21) Appl. No.: 13/155,298

(22) Filed: Jun. 7, 2011

(65) Prior Publication Data

US 2011/0300007 A1  Dec. 8, 2011

Related U.S. Application Data

(60) Provisional application No. 61/352,266, filed on Jun. 7, 2010.

(51) Int. Cl.
  *F04B 47/06* (2006.01)
  *F04B 35/04* (2006.01)
  *H02K 5/132* (2006.01)

(52) U.S. Cl.
  CPC ................. *F04B 47/06* (2013.01); *F04B 35/04* (2013.01); *H02K 5/132* (2013.01)
  USPC ..................................................... 417/423.3

(58) Field of Classification Search
  USPC .............. 166/105, 66.4, 68; 310/87; 417/414, 417/423.3, 421
  See application file for complete search history.

(56) References Cited

U.S. PATENT DOCUMENTS

| | | | | |
|---|---|---|---|---|
| 2,342,884 | A * | 2/1944 | Moore | 277/331 |
| 2,854,595 | A | 9/1958 | Arutunoff | |
| 3,116,432 | A * | 12/1963 | Ekey | 310/87 |
| 3,999,890 | A * | 12/1976 | Niedermeyer | 417/17 |
| 5,796,197 | A | 8/1998 | Bookout | |
| 6,033,567 | A * | 3/2000 | Lee et al. | 166/265 |
| 6,046,521 | A * | 4/2000 | Heinig | 310/87 |
| 6,100,616 | A | 8/2000 | Heinig et al. | |
| 7,413,009 | B2 * | 8/2008 | Jacobs et al. | 166/105 |
| 2007/0142547 | A1 * | 6/2007 | Vaidya et al. | 524/847 |
| 2008/0289153 | A1 * | 11/2008 | Bowater et al. | 24/274 R |

OTHER PUBLICATIONS

International Search Report; PCT/US2011/039520, Oct. 2011.
International Preliminary Report on Patentability; PCT/US2011/039520, Dec. 2012.

* cited by examiner

*Primary Examiner* — Bryan Lettman
(74) *Attorney, Agent, or Firm* — Crowe & Dunlevy

(57) ABSTRACT

A motor assembly for use in a downhole submersible pumping system includes an electric motor and a motor protection bag. The motor protection bag surrounds a portion of the exterior surface of the motor to form an impermeable, corrosion-resistant barrier. The motor protection bag comprises a seamless, elongate cylindrical having a substantially constant inner diameter and open ends. The motor protection bag may be constructed from a suitable polymer, such as perfluoroalkoxy (PFA) fluoropolymer. The motor protection bag is held in place along the exterior surface of the motor with a plurality of clamps that prohibit the migration of fluid between the exterior of the motor and the motor protection bag.

18 Claims, 4 Drawing Sheets

PFA MOTOR PROTECTION BAG

RELATED APPLICATIONS

This application claims the benefit of U.S. Patent Application No. 61/352,266 filed Jun. 7, 2010, entitled "PFA Motor Protection Bag," the disclosure of which is herein incorporated by reference.

FIELD OF THE INVENTION

This invention relates generally to the field of submersible pumping systems, and more particularly, but not by way of limitation, to a motor protection bag for use with a submersible pumping system.

BACKGROUND OF THE INVENTION

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system must be engineered to withstand an inhospitable downhole environment, which may include wide ranges of temperature, pressure and corrosive well fluids.

Mechanisms and materials designed to protect the individual components of a submersible pumping system, particularly the electric motor, from an inhospitable downhole environment can extend the life of such individual components and result in significant savings to the operator. Typical materials of construction for downhole components are 316 and 416 stainless steels, T9 and Chrome 13 tubing. Specialty coatings, such as Monel®, are also available to further improve the durability of downhole components. In some cases, however, tubing with chrome content between 9 and 13 percent is still not fully capable of long-term exposure to the highly corrosive downhole environment. It is to this and other deficiencies in the prior art that the present invention is directed.

SUMMARY OF THE INVENTION

In a preferred embodiment, a motor assembly for use in a downhole submersible pumping system includes an electric motor and a motor protection bag. The motor protection bag surrounds a portion of the exterior surface of the motor. The motor protection bag comprises a seamless, elongate cylindrical having a substantially constant inner diameter and open ends. In a particularly preferred embodiment, the motor protection bag is constructed from perfluoroalkoxy (PFA) fluoropolymer. The motor protection bag is held in place along the exterior surface of the motor with a plurality of clamps.

WRITTEN DESCRIPTION OF PREFERRED EMBODIMENTS

Figure 1:
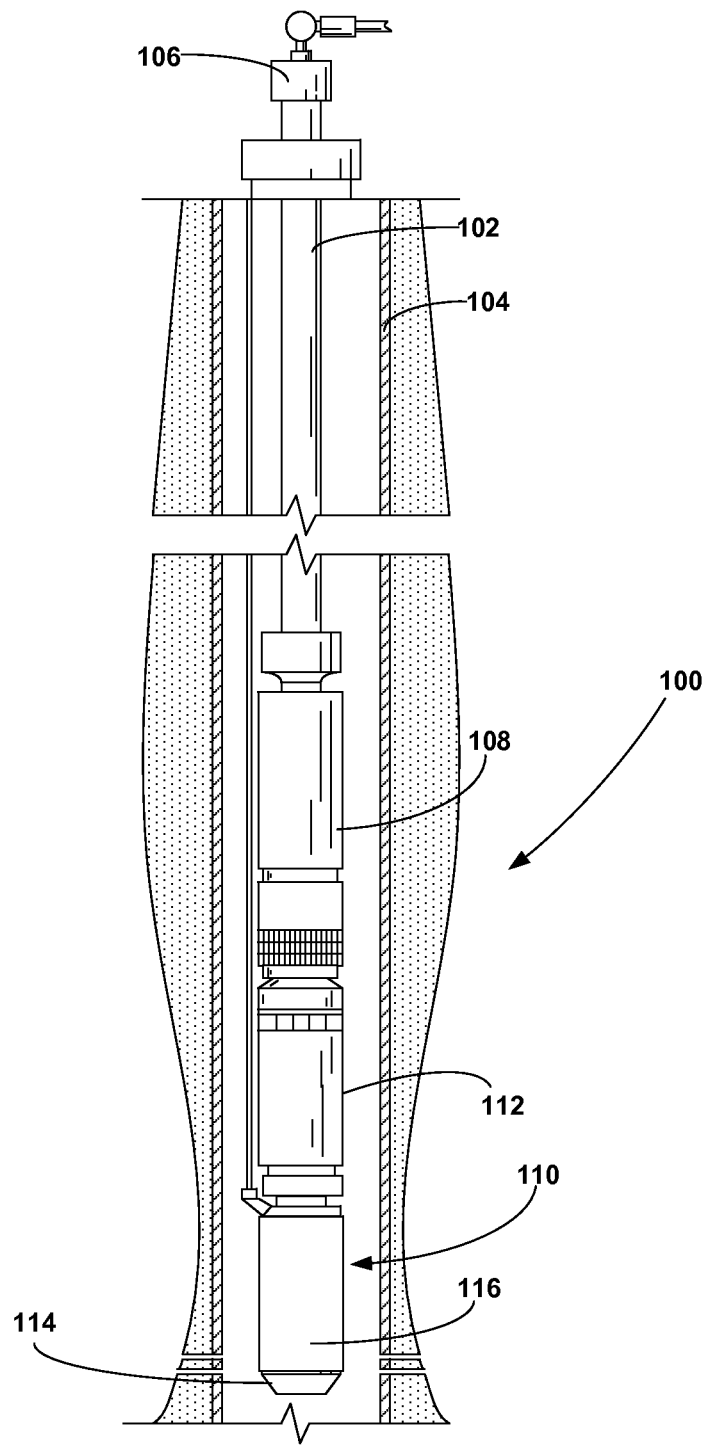
FIG. 1 is an elevational view of a submersible pumping system constructed in accordance with a presently preferred embodiment.

In accordance with a preferred embodiment of the present invention, FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump 108, a motor assembly 110 and a seal section 112. The motor assembly 110 preferably includes an electrical motor 114 that receives power from a surface-mounted motor control unit (not shown). When energized, the motor 114 drives a shaft that causes the pump 108 to operate. The seal section 112 shields the motor 114 from mechanical thrust produced by the pump 108 and provides for the expansion of motor lubricants during operation. The seal section 112 also isolates the motor 114 from the wellbore fluids passing through the pump 108. Although only one of each component is shown, it will be understood that more can be connected when appropriate. It may be desirable to use tandem-motor combinations, multiple seal sections, multiple pump assemblies or other downhole components not shown in FIG. 1.

Figure 2:
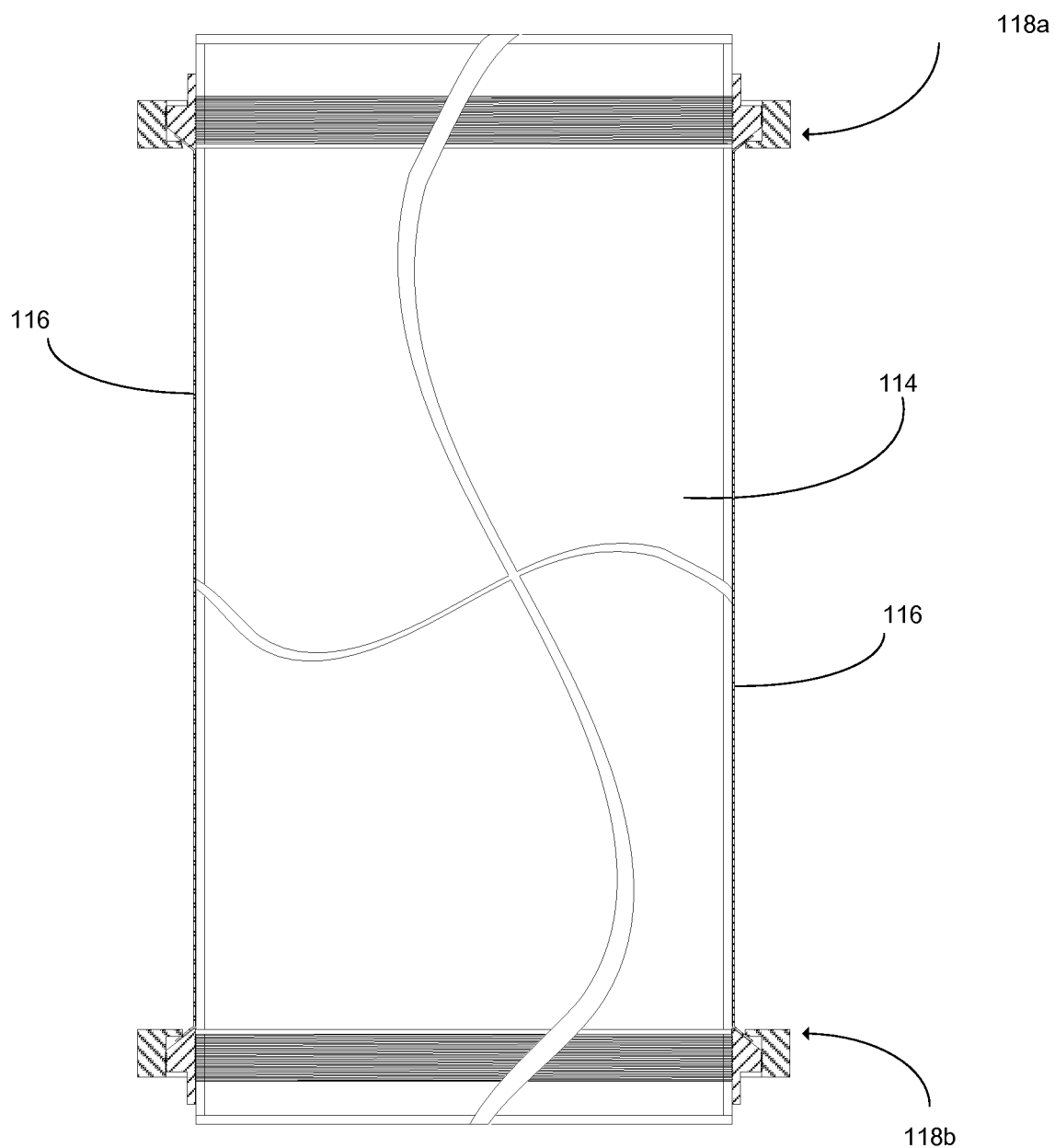
FIG. 2 is a cross-sectional view of a first preferred embodiment of a motor assembly enclosed in a motor protection bag for use with the submersible pumping system of FIG. 1.

Referring now to FIG. 2, shown therein is a side, partial cross-sectional view of the motor assembly 110. The motor assembly 110 further includes a motor protection bag 116 that surrounds a portion of the exterior surface of the motor 114. The motor protection bag 116 presents an impermeable, corrosion resistant barrier to the outer surface of the motor 114. Shielding the exterior surface of the motor 114 discourages the premature failure of the motor 114 due to corrosion or other structural fatigue and wear. In addition to the enhanced resistance to corrosion, the motor protection bag 116 can be easily removed and replaced in the field as necessary during routine any servicing of the motor 114. In this way, the motor protection bag 116 presents a more cost-effective solution for protecting the exterior surface of the motor 114 than costly metal or ceramic coatings.

In the preferred embodiment, the motor protection bag 116 is fabricated from a perfluoroalkoxy (PFA) fluoropolymer, which is commercially available from a number of sources, including E.I. du Pont de Nemours and Company and Daikin Industries. PFA exhibits favorable resistance to corrosive chemicals and elevated temperatures. PFA is melt-processable using conventional injection molding and screw extrusion mechanisms. The ability to extrude or mold PFA permits the construction of a seamless, unitary motor protection bag 116. Thus, in a preferred embodiment, the motor protection bag 116 is a seamless bag that is fabricated using injection molding or extrusion techniques.

The motor protection bag 116 is secured at selected positions along the length of the motor 114 in a manner that prohibits the migration of wellbore fluids between the motor protection bag 116 and the motor 114. In the preferred embodiment depicted in FIG. 2, the motor protection bag 116 is retained in position by first and second bag plates 118a, 118b. For the purposes of the instant disclosure, the motor protection bag 116 and the first and second bag plates 118a, 118b collectively constitute the bag seal assembly. Although two bag plates 118a, 118b are depicted in FIG. 2, it will be appreciated that additional bag plates 118 may be employed in applications where more than a single motor protection bag 116 is installed over the selected downhole component.

Figure 3:
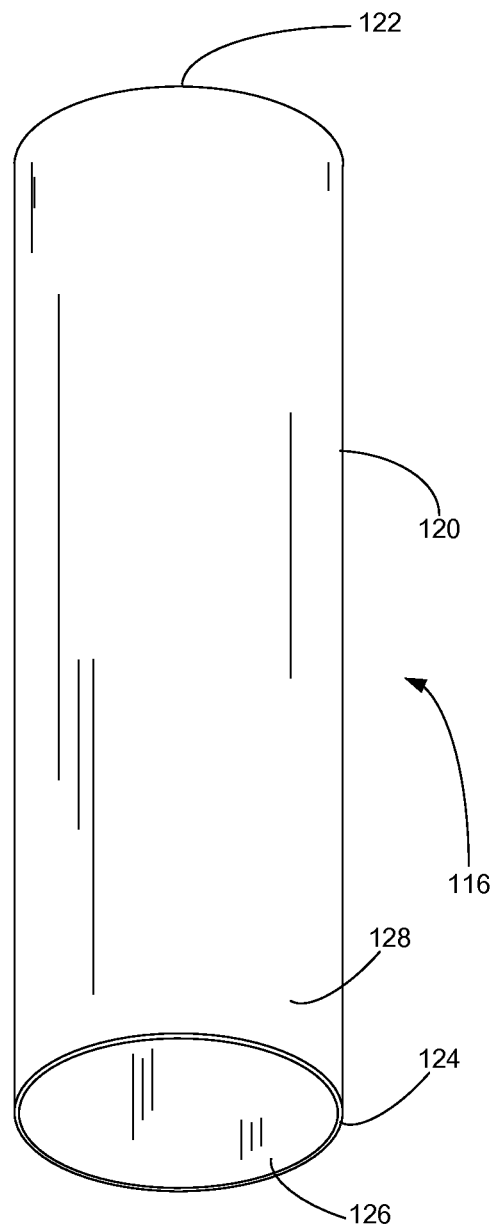
FIG. 3 is a side perspective view of the motor protection bag of FIG. 2.

Turning now to FIG. 3, shown therein is a side perspective view of a preferred embodiment of the motor protection bag 116. The motor protection bag 116 preferably includes a central portion 120, a first end 122 and a second end 124. The motor protection bag 116 is substantially configured as an elongated cylinder with an inner surface 126 and an outer surface 128. In a particularly preferred embodiment, the motor protection bag 116 has a substantially constant diameter along the entire length of the motor protection bag 116.

Figure 4:
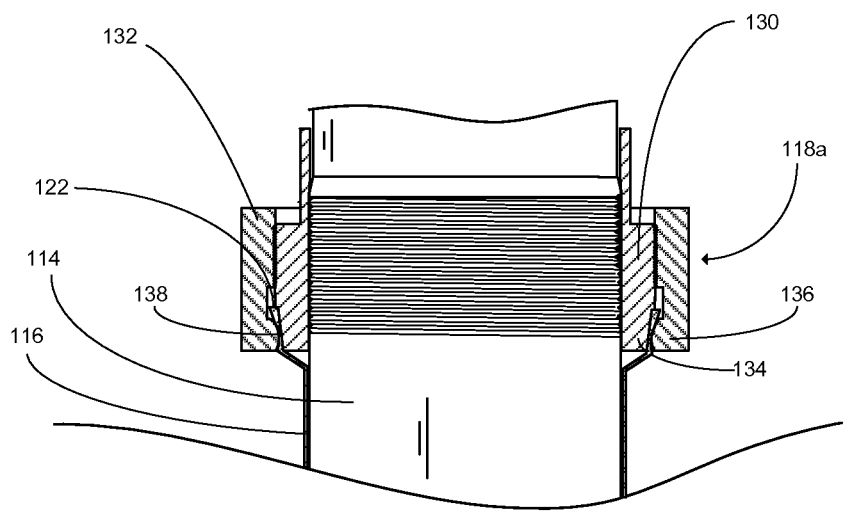
FIG. 4 is a side cross-sectional view of the first preferred embodiment of the bag plate of the motor assembly of FIG. 2.
Figure 5:
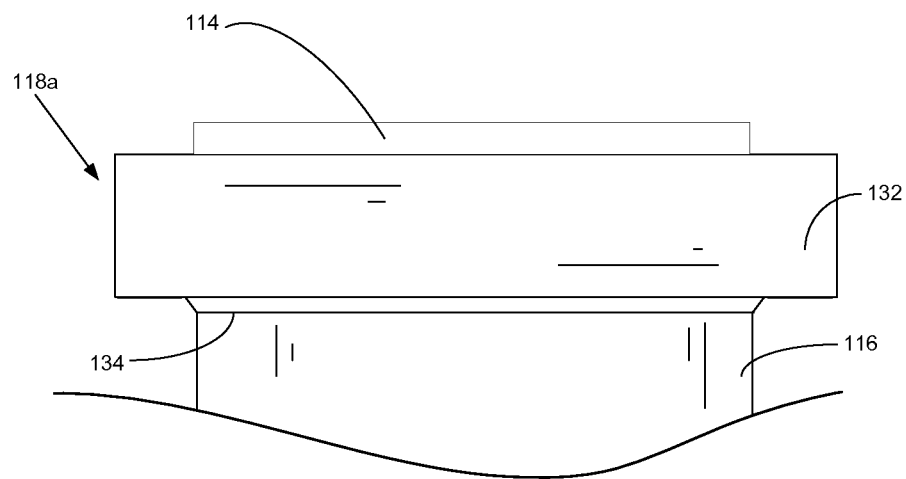
FIG. 5 is a view of the bag plate of FIG. 4.

Turning now to FIGS. 4 and 5, shown therein is a close-up, partial cross-sectional view of the engagement between the motor protection bag 116, the motor 114 and bag plate 118a. Although only bag plate 118a is shown in FIGS. 5 and 6, it will be appreciated that bag plate 118b makes use of the same components on the opposite end of the motor protection bag 116 (as shown in FIG. 2). Unless otherwise specified, the various components within the bag plates 118a, 118b of the preferred embodiments in FIGS. 5 and 6 are the same.

In the presently preferred embodiments, the bag plate 118a includes an end cap 130 and a locking collar 132. The end cap 130 preferably includes a tapered head 134. In the preferred embodiment depicted in FIG. 4, the end cap 130 threadingly engages with the exterior surface of the motor 114. Alternatively, the end cap 130 can be configured to rest on a shoulder formed on the outside surface of the motor 114.

The head 134 of the end cap 130 is preferably tapered from a first outer diameter that is larger than the inner diameter of the motor protection bag 116 to a second outer diameter that is smaller than the inner diameter of the motor protection bag 116. In this way, the first end 122 of the motor protection bag 116 can be pushed onto the head 134 of the end cap 130. As the motor protection bag 116 is inserted onto the head 134, the elasticity of the PFA material allows the motor protection bag 116 to stretch to conform to the increasing diameter of the head 134 of the end cap 130. The engagement between the motor protection bag 116 and the head 134 is superior to prior methods of securing seal bags because the elastic nature of the motor protection bag 116 reduces the dependency on tight manufacturing tolerances otherwise required between sealing surfaces. Accordingly, the ability of the motor protection bag 116 to conform to the contour of the head 134 of the end cap 130 reduces the risk of a seal failure and obviates the need for o-rings or other mechanical seals found in prior designs.

The motor protection bag 116 is held in place over the head 134 by the locking collar 132, which applies a compressive force on the end portion 132 of the motor protection bag 116 that is extended over the head 134. The locking collar 132 includes a contact ring 136 that includes a tapered interior surface 138. The tapered interior surface 138 is preferably oriented at a different angle than the tapered surface of the head 134. The incongruent angles ensure that an area of contact or interference will be established between the tapered interior contact surface 138 and tapered head 134. The compressive force of the locking collar 132 further improves the sealed engagement between the motor protection bag 116 and the end cap 130. The locking collar 132 is preferably configured for threaded engagement over the outside of the end cap 130.

In a preferred method of installation, the end cap 130 of a first bag plate 118 is secured at a selected position on the outside of motor 114. The motor protection bag 116 is then inserted over the opposite end of the motor 114. Although the inner diameter of the motor protection bag 116 is preferably large enough to be pulled over the motor 114 without significant difficulty, it may be desirable to make use of a suitable assembly lubricant to advance the motor protection bag 116 onto the motor 114. The use of an assembly lubricant may also minimize the presence of air trapped between the motor protection bag 116 and the motor 114.

Preferably, the motor protection bag 116 is then forced onto the head 134 of the end cap 130 of the bag plate 118. A first locking collar 132 is extended over the free end of the motor protection bag 116 and moved into position adjacent the first end caps 130. The locking collar 132 is then rotated into threaded engagement with the end cap 130 until the tapered interior surface 138 of the contact ring 136 applies sufficient compression to the motor protection bag 116. Due to the linear advancement of the locking collar 132 as it is threaded onto end cap 130, the compression exerted between the offset angled tapered head 134 and the tapered interior contact surface 138 can be controlled by adjusting the extent of engagement between the locking collar 132 and end cap 130.

Once the first end of the motor protection bag 116 has been captured by the first bag plate 118, the second locking collar 132 is inserted over the free end of the motor protection bag 116. The second end cap 130 is then secured at a second selected position on the outside of the motor 114. The free end of the motor protection bag 116 is then loaded onto the second end cap 130 and the second locking collar 132 is engaged to secure the second end of the motor protection bag 116. In preferred embodiments, the motor protection bag 116 is installed on the motor 114 before the motor 114 is connected to other components within the pumping system 100.

It will be noted that although the use of bag plates 118a, 118b has been disclosed for securing the motor protection bag 116 in position over the motor 114, it will be appreciated that other mechanisms for holding the motor protection bag 116 are also contemplated as within the scope of preferred embodiments. For example, it may be desirable to use simple worm-gear clamps or Oetiker® clamps to hold one or both ends of the motor protection bag 116 in position on the motor 114.

Additionally, although the bag seal assembly has been disclosed as surrounding the motor 114, it will be understood that the bag seal assembly could be installed elsewhere on the pumping system 100 and production tubing 102 where additional corrosion resistance is desired. For example, it may be desirable to integrate the bag seal assembly around the exterior of the pump 108 or the exterior of the seal section 112.

It is to be understood that even though numerous characteristics and advantages of various embodiments of the present invention have been set forth in the foregoing description, together with details of the structure and functions of various embodiments of the invention, this disclosure is illustrative only, and changes may be made in detail, method of sealing and assembly, especially in matters of structure, arrangement and quantity of parts comprising this assembly within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

It is claimed:

1. A motor assembly for use in a submersible pumping system configured to move fluids in a wellbore, the motor assembly comprising:
    a motor, wherein the motor has a motor housing and wherein the motor housing has an exterior surface;
    a motor protection bag, wherein the motor protection bag has open ends and surrounds a portion of the exterior surface of the motor housing and isolates the exterior surface of the motor housing from the fluids surrounding the motor within in the wellbore; and
    a pair of bag plates, wherein each one of the bag plates secures a separate one of the open ends to the exterior surface of the motor housing.

2. The motor assembly of claim 1, wherein the motor protection bag comprises a seamless, elongated cylinder having a substantially constant inner diameter.

3. The motor assembly of claim 1, wherein each of the pair of bag plates comprises:
    an end cap secured to the exterior surface of the motor housing; and
    a locking collar configured for threaded engagement with the end cap.

4. The motor assembly of claim 3, wherein the end cap includes a tapered head that tapers from a first diameter to a second diameter to allow the motor protection bag to stretch to conform to the increasing diameter of the head.

5. The motor assembly of claim 4, wherein the locking collar includes a contact ring and a tapered interior surface, wherein the tapered inner surface of the locking collar is tapered at a different angle than the taper on the tapered head of the end cap.

6. The motor assembly of claim 1, wherein the motor protection bag is constructed from perfluoroalkoxy (PFA) fluoropolymer.

7. A submersible pumping system comprising:
    a pump;
    a seal section secured to the pump; and
    a motor assembly secured to the seal section, wherein the motor assembly comprises:
        a motor, wherein the motor has a motor housing that has an exterior surface; and
        a motor protection bag in contact with the exterior surface of the motor housing, wherein the motor protection bag isolates the exterior surface of the motor housing from the fluids surrounding the motor in a wellbore.

8. The submersible pumping system of claim 7, wherein the motor protection bag comprises a seamless, elongated cylinder having a substantially constant inner diameter and open ends.

9. The submersible pumping system of claim 8, wherein the motor protection bag is held in place on the exterior surface of the motor housing with a pair of bag plates.

10. The submersible pumping system of claim 9, wherein each of the pair of bag plates comprises:
    an end cap secured to the exterior surface of the motor housing; and
    a locking collar configured for threaded engagement with the end cap.

11. The submersible pumping system of claim 10, wherein the end cap includes a tapered head that tapers from a first diameter to a second diameter to allow the motor protection bag to stretch to conform to the increasing diameter of the head.

12. The submersible pumping system of claim 11, wherein the locking collar includes a contact ring and a tapered interior surface, wherein the tapered inner surface of the locking collar is tapered at a different angle than the taper on the tapered head of the end cap.

13. The submersible pumping system of claim 12, wherein the motor protection bag is constructed from perfluoroalkoxy (PFA) fluoropolymer.

14. A motor assembly for use in a submersible pumping system, the motor assembly comprising:
    a motor, wherein the motor has a motor housing that has an exterior surface and an external diameter; and
    a bag seal assembly, wherein the bag seal assembly comprises:
        a motor protection bag in contact with the exterior surface of the motor housing, wherein the motor protection bag isolates the exterior surface of the motor housing from the fluids surrounding the motor in a wellbore; and
        a plurality of clamps configured to secure the motor protection bag to selected positions along the exterior surface of the motor housing.

15. The motor assembly of claim 14, wherein the motor protection bag comprises a seamless, elongated cylinder having a substantially constant inner diameter that conforms to a portion of the external diameter of the motor housing.

16. The submersible pumping system of claim 15, wherein the motor protection bag is constructed from perfluoroalkoxy (PFA) fluoropolymer.

17. The motor assembly of claim 14, wherein the plurality of clamps comprise a pair of bag plates that each include:
    an end cap secured to the exterior surface of the motor housing; and
    a locking collar configured for threaded engagement with the end cap.

18. The motor assembly of claim 14, wherein at least one of the plurality of clamps comprises a worm-gear clamp.

* * * * *